US008849428B2

(12) United States Patent
Hollander et al.

(10) Patent No.: US 8,849,428 B2
(45) Date of Patent: Sep. 30, 2014

(54) FIELD CONFIGURABLE BALLAST

(75) Inventors: Jonathan Hollander, Petach Tikva (IL); Ben Enosh, Udim (IL)

(73) Assignee: Metrolight Ltd., Netanya (IL)

( * ) Notice: Subject to any disclaimer, the term of this patent is extended or adjusted under 35 U.S.C. 154(b) by 1932 days.

(21) Appl. No.: 11/910,920

(22) PCT Filed: Apr. 11, 2006

(86) PCT No.: PCT/IL2006/000471
§ 371 (c)(1),
(2), (4) Date: May 5, 2008

(87) PCT Pub. No.: WO2006/109313
PCT Pub. Date: Oct. 19, 2006

(65) Prior Publication Data

US 2009/0218959 A1 Sep. 3, 2009

Related U.S. Application Data

(60) Provisional application No. 60/670,273, filed on Apr. 12, 2005.

(51) Int. Cl.
*G05B 11/01* (2006.01)

(52) U.S. Cl.
USPC ............. 700/22; 700/291; 700/295; 700/286; 700/297

(58) Field of Classification Search
USPC ............. 315/209 R, 291–294, 307, 308, 312, 315/316, 318, 224, DIG. 4, DIG. 7; 340/4.3, 340/4.31, 4.32, 4.33; 700/19, 20, 22, 286, 700/291–298
See application file for complete search history.

(56) References Cited

U.S. PATENT DOCUMENTS

| | | | | | |
|---|---|---|---|---|---|
| 5,128,592 | A | | 7/1992 | Dean et al. | |
| 5,187,655 | A | * | 2/1993 | Post et al. | 700/17 |
| 5,471,119 | A | * | 11/1995 | Ranganath et al. | 315/307 |
| 5,600,211 | A | | 2/1997 | Luger | |
| 5,909,183 | A | * | 6/1999 | Borgstahl et al. | 340/4.3 |

(Continued)

FOREIGN PATENT DOCUMENTS

| | | | |
|---|---|---|---|
| CA | WO0143510 | A1 | 6/2001 |
| WO | WO 2005/084085 | | 9/2005 |

OTHER PUBLICATIONS

PCT, International Preliminary Report on Patentability, International application No. PCT/IL06/00471, Jun. 8, 2008.

(Continued)

*Primary Examiner* — Tuyet Thi Vo
(74) *Attorney, Agent, or Firm* — Dr. Hanan Farber Patent Agent Ltd.

(57) ABSTRACT

A method for employing an electronic ballast. A distributor is provided with the electronic ballast. An operative parameter of the electronic ballast is configurable to operate a type of gas discharge lamp. The distributor is further provided with a configuration mechanism for configuring said electronic ballast. The electronic ballast is attached to the configuration mechanism, the configuration mechanism is attached to a client computer and the client computer is operatively attached to a configuration service, typically over a wide area network, e.g. Internet. The distributor, using the client computer, requests from the configuration server to configure the ballast. The configuration is performed using the configuration mechanism by transmitting instructions from the configuration server to the client computer in response to the request.

23 Claims, 6 Drawing Sheets

(56) References Cited

U.S. PATENT DOCUMENTS

| | | | |
|---|---|---|---|
| 5,925,990 A | 7/1999 | Crouse et al. | |
| 6,040,661 A * | 3/2000 | Bogdan | 315/224 |
| 6,137,240 A | 10/2000 | Bogdan | |
| 6,359,387 B1 | 3/2002 | Giannopoulos et al. | |
| 6,400,095 B1 | 6/2002 | Primisser et al. | |
| 6,414,449 B1 | 7/2002 | Hui et al. | |
| 6,650,067 B1 * | 11/2003 | Shloush et al. | 315/291 |
| 6,914,395 B2 | 7/2005 | Yamauchi et al. | |
| 7,009,348 B2 * | 3/2006 | Mogilner et al. | 315/307 |
| 7,027,736 B1 * | 4/2006 | Mier-Langner et al. | 340/12.29 |
| 7,451,224 B1 * | 11/2008 | Stamler | 709/228 |
| 2003/0149706 A1 * | 8/2003 | Neal et al. | 707/104.1 |
| 2003/0222603 A1 | 12/2003 | Mogilner et al. | |
| 2004/0007994 A1 * | 1/2004 | Ribarich et al. | 315/307 |
| 2004/0051467 A1 * | 3/2004 | Balasubramaniam et al. | 315/294 |
| 2004/0130274 A1 * | 7/2004 | DuLaney et al. | 315/291 |
| 2004/0183472 A1 | 9/2004 | Kamoi et al. | |
| 2005/0128666 A1 * | 6/2005 | Pogodayev et al. | 361/58 |
| 2005/0225263 A1 | 10/2005 | Van Egmond | |
| 2006/0202851 A1 * | 9/2006 | Cash et al. | 340/825.69 |
| 2008/0278096 A1 * | 11/2008 | Berjansky | 315/291 |

OTHER PUBLICATIONS

Israel Patent Office, examination report, Application No. 186520, Feb. 25, 2010.

Israel Patent Office, examination report, Application No. 186520, Jan. 24, 2012.

Letter in response to Israel Patent Office Feb. 22, 2011.

Letter in response to Israel Patent Office Apr. 23, 2012.

* cited by examiner

21

Daisy Chain of Ballasts 10 during Configuration

FIELD CONFIGURABLE BALLAST

FIELD AND BACKGROUND OF THE INVENTION

The present invention relates to electronic ballasts for gas discharge lamps and, more particularly, to a method of configuring ballasts for use with different types of gas discharge lamps.

Many types of gas discharge lamps are in common use, including mercury vapor lamps, low pressure and high pressure sodium lamps and fluorescent lamps. HID lamps or Mercury Vapor Lamp is a gas discharge lamp which uses mercury in an excited state to produce light. The arc discharge is generally confined to a small fused quartz tube mounted within a larger borosilicate glass bulb. The outer bulb may be clear or coated with a phosphor; in either case, the outer bulb provides thermal insulation, protection from ultraviolet radiation, and a convenient mounting for the fused quartz arc tube. Mercury vapor lamps (and their relatives) are often used because they are relatively efficient while offering better color rendition than either low- or even high-pressure sodium vapor lamps. Mercury vapor lamps also feature a very long lifetime.

HID lamps or Mercury vapor lamps, like fluorescent usually require a starting mechanism. In this case, though, the starting mechanism is usually contained within the mercury vapor lamp itself. Two main types of starting mechanism are pulse start lamps and probe start lamps. The pulse start lamp has only 2 electrodes, and they require a significant voltage pulse (typically 4 KV) in order to start the lamp. Probe start lamps contain a third electrode mounted near one of the main electrodes and connected through a resistor to the other main electrode. When power is applied, there is sufficient voltage to strike an arc between the starting electrode and the adjacent main electrode. The arc discharge produced eventually provides enough ionized mercury to strike an arc between the main electrodes. Occasionally, a thermal switch is installed to short the starting electrode to the adjacent main electrode, completely suppressing the starting arc once the main arc strikes.

A lamp closely related to the mercury vapor lamp is the Metal halide lamp which uses various other elements in an amalgam with the mercury. Sodium iodide and Scandium iodide are commonly in use. Metal halide lamps produce a much better quality light without resorting to phosphors. If Metal Halide lamps use a starting electrode, there is a thermal shorting switch to eliminate any electrical potential between the main electrode and the starting electrode once the lamp is lit. An electrical potential in the presence of the halides can cause the failure of the glass/metal seal). More modern metal halide systems do not use a separate starting electrode; instead, the lamp is started using high voltage pulses as with high-pressure sodium vapor lamps (Pulse start lamps).

LPS Lamps (Low Pressure Sodium) consist of an outer vacuum envelope of glass coated with an infrared reflecting layer of indium (allows the light wavelengths out and keeps the infrared (heat) in). The LPS lamp has an inner borosilicate 2 ply glass U shaped tube containing sodium metal and a small amount of neon and argon gas to start the gas discharge, High pressure Sodium (HPS) lamps are smaller and contain some other elements (e.g. mercury), produce a dark pink glow when first struck, and produce a pinkish orange light when warmed up.

A gas discharge lamp is a negative resistance device and therefore requires auxiliary electronics, i.e. a ballast to prevent the lamp from destroying itself. An electronic ballast uses solid state electronic circuitry to provide the proper starting and operating electrical condition to power the gas discharge lamp. Electronic ballasts are generally smaller and lighter, function cooler and more efficiently than electromagnetic ballasts.

In addition to the type of gas discharge lamp, there is a wide range of power ratings, varying typically between 20 and 2000 watts. Consequently, a supplier of lamps and ballasts needs to stock hundreds of different ballasts, each ballast with its own part number for supporting all the different types of gas discharge lamps and all the available power ratings. Moreover, electronic ballast may include many features built in such as dimming control, depth of dimming level, time to dimming from start, number of ignition trials, total interval for ignition trials, temperature range, input voltage range, ballast parameter changes (for example to adapt the ballast to new lamps, etc.

There is thus a need for, and it would be highly advantageous to have a method of configuring a ballast part to support as required different types of gas discharge lamps of different power ratings. By stocking a single part number, a considerable savings in logistics costs is achieved.

The terms "distributor", "reseller" and "customer" are used herein interchangeably and refers to either a wholesaler or a final consumer of ballast products and/or employees thereof and/or another acting on behalf of the distributor.

The terms "configuration" and "reconfiguration" are used herein interchangeably.

SUMMARY OF THE INVENTION

According to the present invention there is provided a method for employing an electronic ballast. A distributor is provided with the electronic ballast. An operative parameter of the electronic ballast is configurable to operate a type of gas discharge lamp. The distributor is further provided with a configuration mechanism for configuring said electronic ballast. The electronic ballast is attached to the configuration mechanism, the configuration mechanism is attached to or includes a client computer and the client computer is operatively attached to a configuration service, typically over a wide area network, e.g. Internet. The distributor, using the client computer, requests from the configuration server to configure the ballast. The configuration is performed using the configuration mechanism by transmitting instructions from the configuration server to the client computer in response to the request. The electronic ballast is detached from the configuration mechanism. Prior to configuring, a parameter of the electronic ballast is verified. Typically, a service policy for said ballast is based on the configuration. The configuration mechanism includes a communications mechanism which communicates between the client computer and the electronic ballast. During configuration, operative parameters, and/or software version are stored in memory included in the electronic ballast.

According to the present invention there is provided a ballast configured according to the methods disclosed herein.

According to the present invention there is provided a computerized method for remotely configuring an electronic ballast by a configuration server over a network. A distributor is provided with the electronic ballast and a configuration mechanism for configuring the ballast. A request is received from the distributor to configure the electronic ballast and the electronic ballast is configured by transmitting instructions to the configuration mechanism. A data base attached to the configuration server is updated based on the request. Preferably operative parameters of the electronic ballast are configurable to operate at least one type among many types of gas discharge lamps. The electronic ballast is preferably attached to the configuration mechanism solely during the configuration and subsequent to the configuration, the configuration mechanism is detached from the ballast. The service policy for the electronic ballast is modified upon updating the data base.

According to the present invention there is provided a program storage device readable by a configuration server, tangibly embodying a program of instructions executable by the configuration server to perform a method for configuring an electronic ballast, wherein a distributor is provided with the electronic ballast and a configuration mechanism for said configuring, the method as disclosed herein.

According to the present invention there is provided, a method for configuring an electronic ballast. A distributor is provided with the electronic ballast and a client computer. The client computer is operatively attached to a configuration service. The distributor requests to configure the electronic ballast, a configuration request is transmitted from the client computer to the configuration service. The electronic ballast is configured by receiving instructions from the configuration service, the instructions are in response to the configuration request. Upon completing the configuration, the electronic ballast is detached from the client computer. Preferably, the distributor tenders or arranges payment to the configuration service for the configuration of the electronic ballast and an invoice is printed for the payment.

According to the present invention there is provided a program storage device readable by a client computer, tangibly embodying a program of instructions executable by the client computer to perform a method for configuring an electronic ballast, wherein a distributor is provided with the electronic ballast and a client computer for the configuration, wherein the client computer is operatively attached to a configuration service, the method as disclosed herein.

According to the present invention there is provided a method for employing an electronic ballast. A distributor is provided with the electronic ballast, and one or more operative parameters of the electronic ballast is configurable to operate a gas discharge lamp type. The distributor is provided with a configuration mechanism for configuring the electronic ballast. The distributor attaches the electronic ballast to the configuration mechanism, configures the electronic ballast using the configuration mechanism, and detaches the electronic ballast from the configuration mechanism. Preferably, prior to configuring an identifying parameter of the electronic ballast is verified and a service policy for the ballast is based on the configuring. Preferably, configurable operable parameters include ignition voltage, ignition duration, ignition frequency, warm-up current, output power, dimming level, automatic dimming control, automatic restart, temperature range of said at least one lamp type, input voltage range of said at least one lamp type, and lifetime of said at least one lamp type. The configuration method includes the configuring of one or two or three or four of the operable parameters of the ballast.

According to the present invention there is provided a program storage device readable by a computer, tangibly embodying a program of instructions executable by the computer to perform a method for configuring an electronic ballast, the method as disclosed herein.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
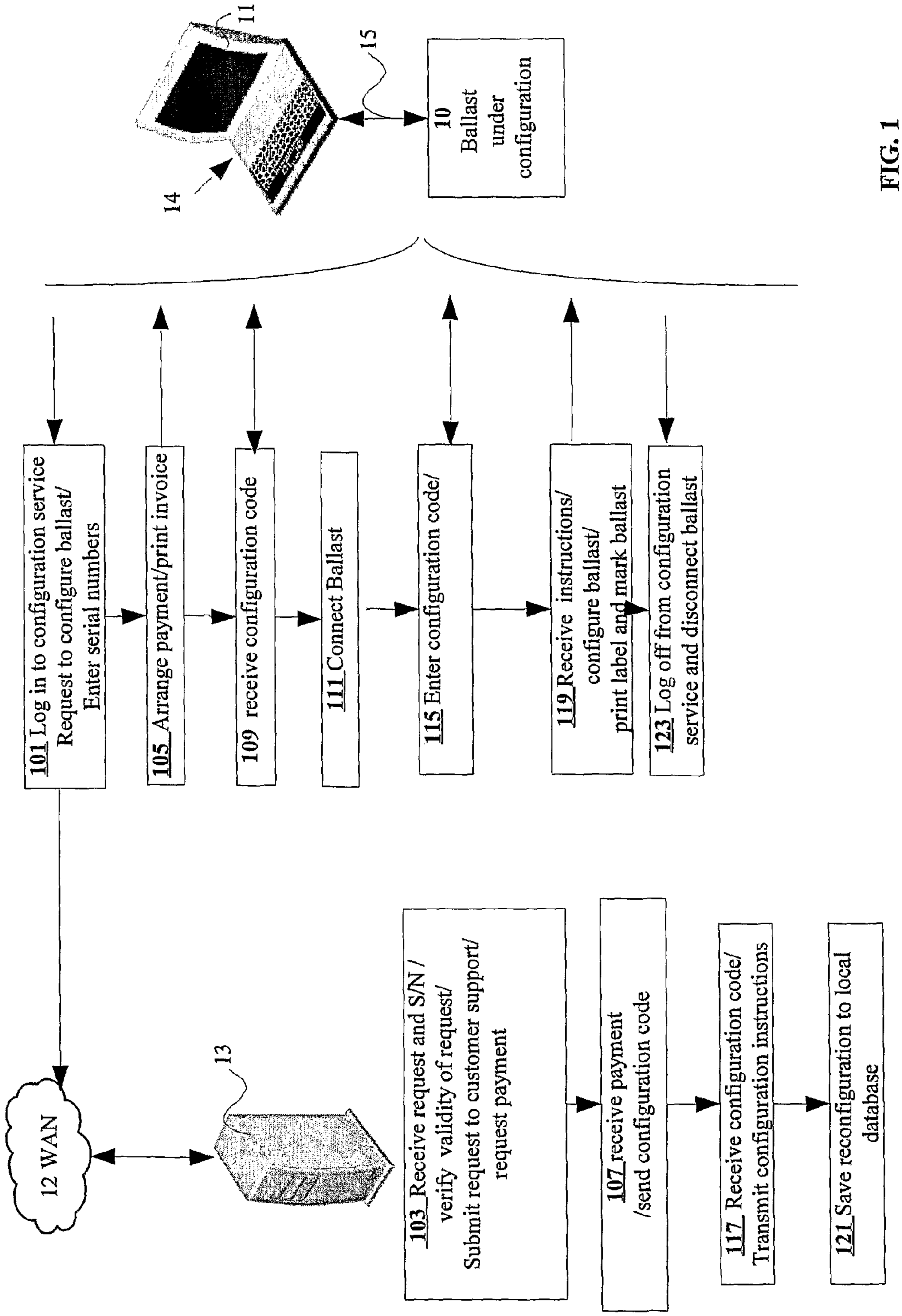
FIG. 1 is a system and flow diagram, according to an embodiment of the present invention.

The present invention is of a system and method for configuring a single ballast for use with different power ratings and/or different lamp types. Specifically, the system and method includes a microprocessor controlled electronic ballast. The electronic ballast includes hardware typically including a microprocessor to support a large range of output powers, e.g. 20-1000 W, and programmable parameters (or software versions) which support different types of lamps and optional features including a dimming option, and dimming delay. According to an embodiment of the present invention, the manufacturer supplies hardware and/or software to a local supplier, reseller, customer or distributor for configuring the ballast. Typically, the distributor requires for configuring the ballast a computer with a connection to a communications port of the ballast.

The distributor typically requires in addition a bar code reader to verify the part number and/or serial number under configuration and a label printer to print labels for marking the new part number subsequent to configuring.

The method, according to an embodiment of the present invention, enables customers or distributors to electronically configure ballast parameters through the communications port preferably without opening the ballast unit. Furthermore, the ballast can be modified in the distributor's warehouse or at the customer site with a communications connection between the microcontroller of the ballast to the computer using a wired or wireless connection. The reconfiguration is preferably performed by the distributor upon requesting configuration instructions over a wide area network from the manufacturer of the field configurable ballast, and upon tendering payment, the distributor configures or reconfigures the ballast.

According to another embodiment of the present invention, the manufacturer configures the ballast prior to shipping and typically the customer or distributor pays the manufacturer of the ballast for configuring or reconfiguring the ballast.

According to yet another embodiment of the present invention, the ballast is reconfigured even when the ballast is already installed in the customer facilities.

Further the configuration mechanism may be of any such mechanisms known in the art and includes a computer and hardware/software required to attach to and program the microprocessor controlling the ballast. Typically, the microprocessor controlling the ballast includes or is attached to non-volatile memory, such as but not limited to PROM, EPROM, EEPROM, Flash memory and optical memory. The configuration mechanism rewrites the software programming the microprocessor and/or parameters stored in the non-volatile memory of the ballast. Parameters that can be configured include: lamp type, ignition voltage, ignition frequency and ignition period. The ignition parameters are typically set in the USA, according to a standard, e.g. ANSI standard for each lamp type. After ignition, warm up current is limited, e.g. to 4-6 amperes depending oil lamp type and manufacturers ratings. Each lamp has a power rating, e.g. 400 watts, during normal operation. Furthermore, each lamp typically has a dimming level, that is the minimum, e.g. 50% of power rating, that the lamp will operate without extinguishing. A group of parameters is related to an automatic dimming feature which program the ballast to reduce power at specific times or periods for instance during the day and/or week to reduce power consumption. Additional parameters are related to an automatic restart feature which causes the ballast to shut down when the lamp burns out, the lamp is overheating or operating under the rated voltage and upon detecting that the problem is solved, e.g. replacing the lamp, igniting and operating the lamp. Each lamp is rated to operate within a specific temperature range. Operating outside the rated temperature causes for instance a corresponding derating of the operating power and/or cutoff which relates to the service policy, i.e. warrantee of the lamp. Similarly, the input voltage rating minimum and maximum are parameters which may relate to derating and/or shutdown. Other configurable parameters relate to protecting the lamp and/or ballast circuit from surges, such as lightning. Configurable parameters may also relate to quality management such as end of rated lifetime of lamp and/or ballast so that the customer knows that the lamp and/or ballast should be replaced.

It should be further noted that the principles of the present invention are equally applicable across the full range of electronic ballasts including "low frequency ballasts operating at tens of Hertz below the acoustic resonance of discharge lamps as well as "high frequency" operating at hundreds of Hertz typically above the acoustic resonance of gas discharge lamps. While the discussion herein is directed toward application of the present invention to gas discharge lamps, the principles of the present invention may be readily adapted for use with fluorescent lamps as well.

The principles and operation of a system and method of employing ballasts in the field, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Reference is now made to FIG. 1, a simplified block diagram and flow diagram of an embodiment of the present invention. A ballast 10 under configuration or reconfiguration is connected to a client computer 14 through a communications interface 15. Client computer has a connection over a wide area network (WAN) 12 to a configuration server 13, typically owned by the manufacturer e.g. Metrolight Ltd. of ballast 10. Configuration server 13 provides the configuration service, according to an embodiment of the present invention.

Using client computer 14, customer enters customer support section of the electronic ballast manufacturer and finds a "Request for ballast parameter change form" available online through wide area network 12, e.g. at Internet site www-.metrolight.com The following steps are typically performed according to the numerical order of the numerical references to the steps.

101 Customer logs in the configuration service. Customer enters the configuration or re-configuration request for the required changes to operative parameters of ballast 10. Customer typically enters a serial and/or part number either manually, or for instance the serial/part number is read automatically using a bar code scanner or other automatic mechanism.

103 At server 13, validity of the request is received and verified (step 103). An example of verifying validity is for instance if the requested parameter, e.g. power output, is within the rating of the ballast. After receiving the configuration request, a reply electronic mail message, is preferably sent automatically, which indicates that the configuration request has been received. The reply message is sent for instance, to a specified electronic mail address with a notification that the request will be handled within a specific time period, e.g. within 24 hours. The form content is submitted to Customer Support, for instance by electronic mail. Optionally, configuration server 13 saves the request to a local database. Open verifying the validity of the request, payment for configuration is requested (step 103) from the customer. Alternatively, validity of the request is verified at client 14 using an agent or otherwise software installed on client 14.

105 Customer arranges payment and prints invoice/receipt as required

107 The configuration service receives payment and sends a configuration code associated with the serial number and/or part number of ballast 10 under configuration.

109 Client computer receives the configuration code. A user of client computer 14, connects (step 111) ballast under configuration using interface 15. The user logs in to the configuration service (if not currently logged in) and enters, or automatically transfers the configuration code, or alternatively a hash or derivative of the received configuration code based on the serial/part number of ballast 10.

117 Upon receiving the configuration code, configuration server 13 transmits instructions which either programs ballast 10 directly or enable programming to occur by software previously installed on client 14.

119 Client 14 receives instructions which are transferred directly to ballast 10 for configuration or client 14 performs configuration based on the instructions received from configuration server 13.

121 At server 13, configuration is stored in a local database, and a service policy for ballast 10 is updated accordingly.

123 User at client 14 logs off from configuration service and disconnects ballast 10.

Figure 2A:
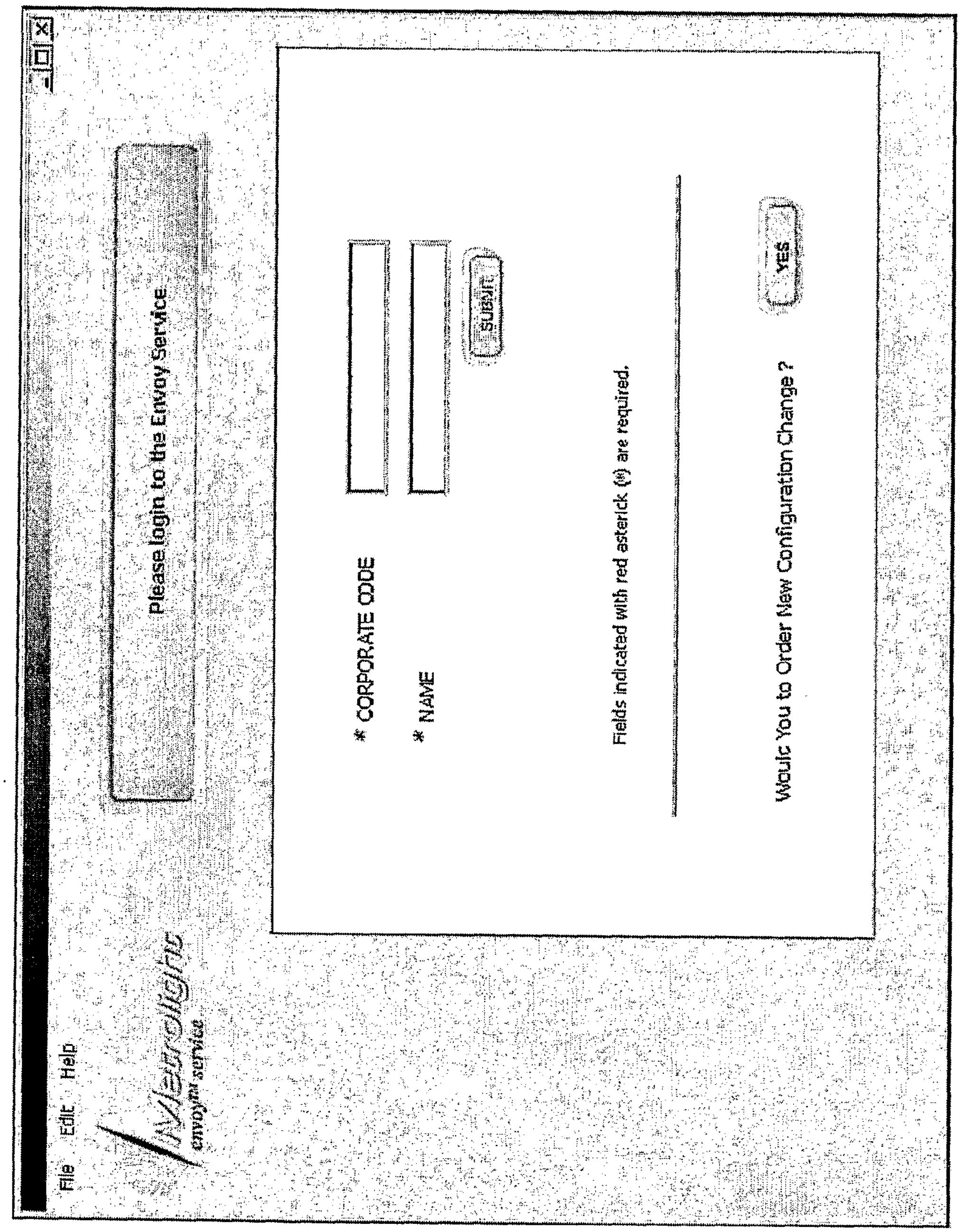
FIG. 2*a*-2*d* are illustrations of layouts of a computer display, according to an embodiment of the present invention.
Figure 2B:
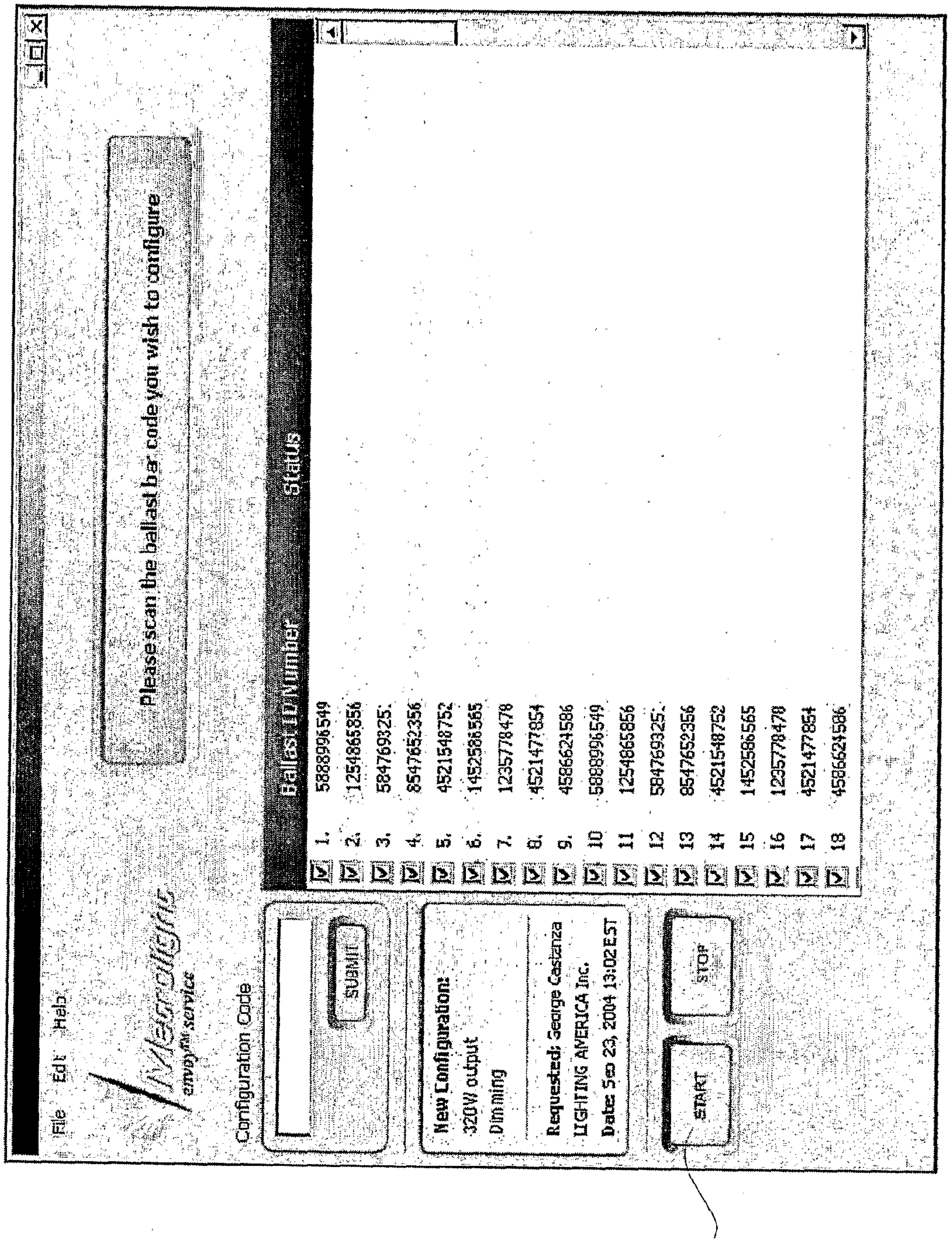
Figure 2C:
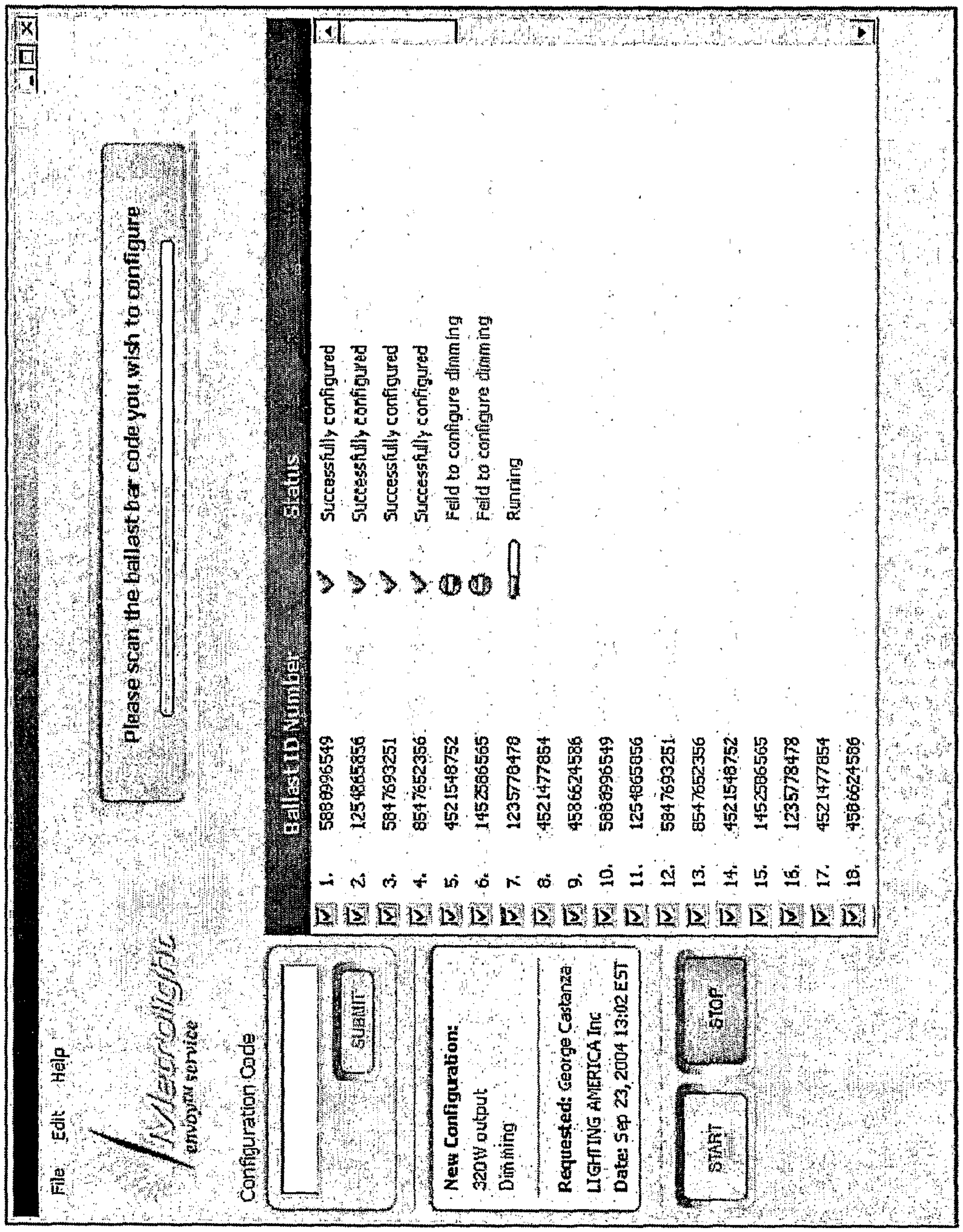
Figure 2D:
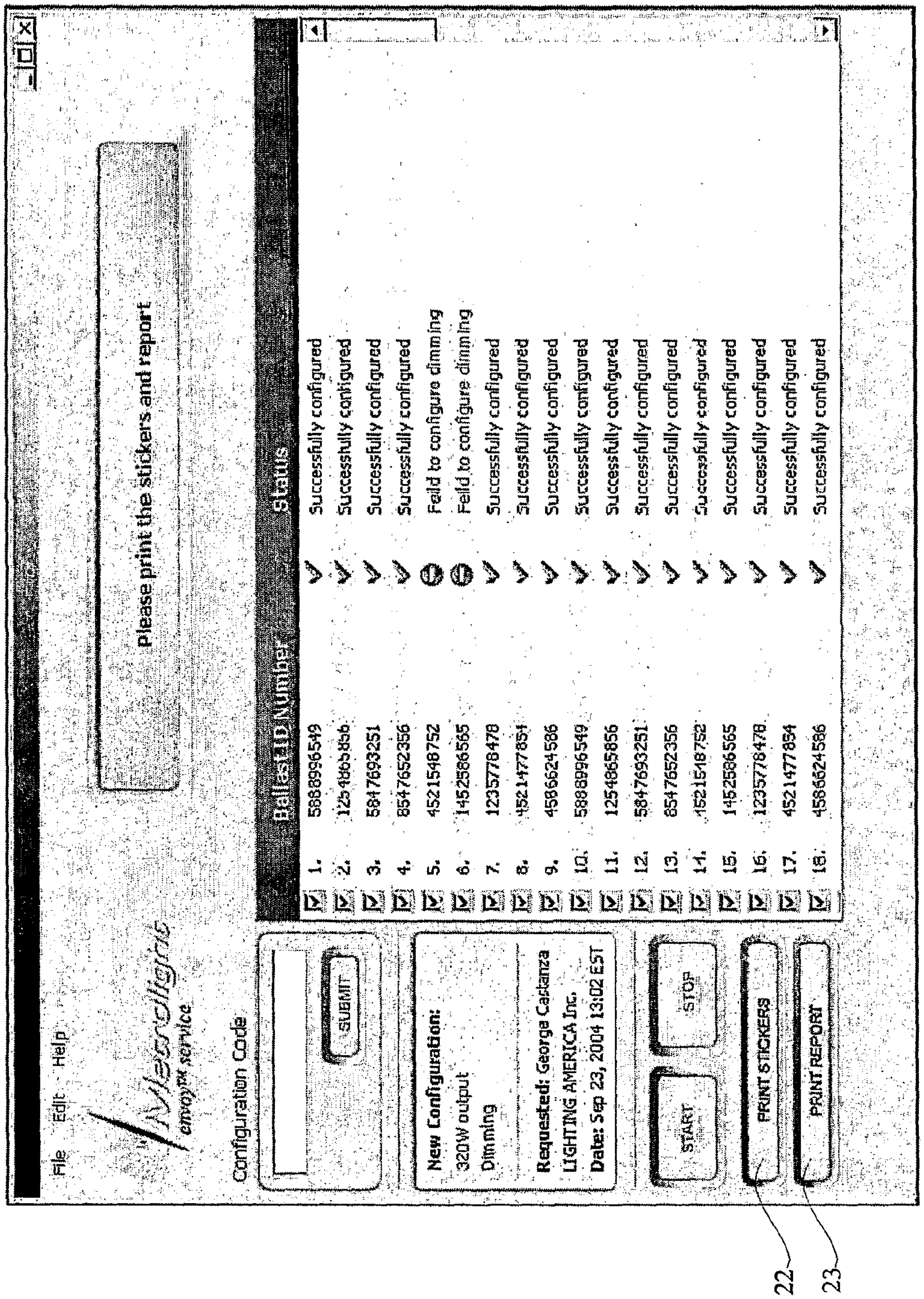

Reference is now made to FIGS. 2*a*-2*d* which illustrate layouts of display screen 11 of client computer 14, in an example of the present invention. A logistics person George Castanza at the warehouse of Lighting America Inc. logs in (step 101) to configuration server 13. FIG. 2*a* illustrates a log-in window for ordering a change in ballast 10 configuration. George scans (using for instance an optical handheld barcode scanner) the barcode labels of ballasts 10 prior to configuring (step 119). As the barcodes of ballasts 10 are scanned, corresponding serial numbers appear on display screen 14 as illustrated in FIG. 2*b*. After barcodes are scanned, George selects one hundred ballasts 10 are to be configured with new parameters 320W output power with a dimming feature. George then presses a Start Button 21 which requests (step 101) from configuration server 13 to perform the configuration and serial numbers of the ballasts to be configured are transmitted to configuration server 13. George then typically arranges payment (step 105) if applicable, and a configuration code is generated; the configuration code associated with ballasts 10 to be configured is transmitted (step 115) by client computer 14 and received (step 117) by configuration server 13, instructions for configuration of ballasts 10 are transmitted (step 117) to client computer 14, and the configuration is executed (step 119). During execution (step 119), success or failure to configure is displayed on display screen 11 under the column labeled "status" in FIG. 2*c*. When the batch of ballasts 10 have been configured (step 119) (or failed to configure) display 11 shows virtual buttons "print labels" 22 which when selected generates labels for labeling the ballasts subsequent to configuring (step 119) (or labels marking rejects) and "print report" 23 which prints a reports of the configuration process for quality management.

During ballast configuration (step 119), if a scanned serial number S/N does not equal the programmed S/N stored in memory within ballast 10 then ballast 10 will not be configured. According to an embodiment of the present invention, a status update to server 13 will typically be sent for each ballast 10 before continuing with the next ballast. The status report will include the following options:

Successfully configured

Failure to configure—S/N not correct,

Ballast fault—i.e. ballast has not been fully configured, changes have been partially executed to one or more parameters, and current configuration of ballast 10 is not defined.

When a batch of ballasts 10 is fully configured a message will be displayed on display 11: "New label must be printed and attached to Ballast". Preferably, he user is not allowed to proceed with configuration procedure (step 119) without printing a label for ballast 10 after configuration. Alternatively, in order to print labels, the user will use print labels button 22, and labels will be printed for all of newly configured ballasts 10.

Referring back to FIG. 1, in step 121, configuration information of each ballast 10 is saved in a data base by server 13. Saved configuration information is typically used to update a service policy of ballast 10 upon configuration. For instance, a ballast 10, originally configured and operated at 200 W in reconfigured at 320, according to an embodiment of the present invention. Using the data base, a service policy for ballast 10 is updated, for instance a money back warrantee policy which expires after five years prior to reconfiguration is changed to expire after three years subsequent to reconfiguration.

Figure 3:
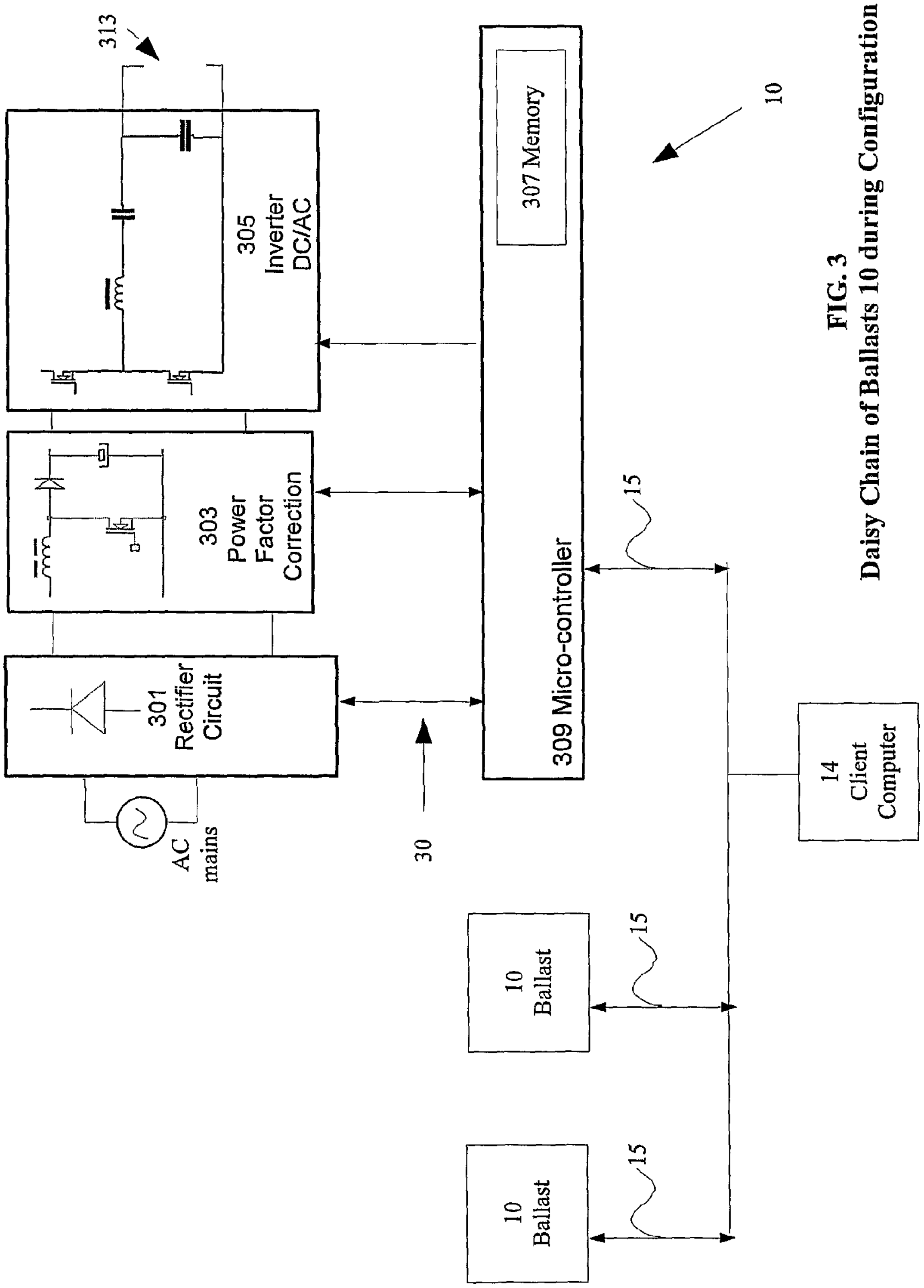
FIG. 3 is a simplified schematic drawing of a ballast undergoing configuration according to an embodiment of the present invention, and "daisy chaining" of like ballasts.

Reference is now made to FIG. 3 which illustrates a simplified block diagram of a configurable ballast 10, being configured according to an embodiment of the present invention. Configurable ballast 10 is includes a rectifier circuit 301 which rectifies the alternating current of the power line to direct pulsating current. The pulsating direct current is input to a circuit 303 that performs "power factor correction" (PFC). "Power factor" is a figure of merit indicating to what extent the current and the voltage are in phase. PFC 303 also filters the current to reasonably constant direct current. PFC circuit 303 is sometimes followed by a "buck converter" (not shown in FIG. 3) providing a current source and performing a DC-DC step down conversion. The "buck converter" is followed by a full-wave or half-wave bridge 305 operating as an "inverter" outputting a for instance a square wave at output 313 to the discharge lamp. Microprocessor 309 monitors and controls 30 are used to control all the functions of the ballast circuit, including frequency of switching at gates of FET in PFC circuit 303 and inverter circuit 305, voltage levels, output power levels and features such as dimming capability of ballast 10. The communications interface 15 used in ballast 10 is preferably a simple two or three wire serial bus (e.g. UART, $I^2C$ or SPI) integrated with the microprocessor controlling ballast 10. The two or three pins of the microprocessor required for communications during configuration (step 119) are preferably reused for other purposes during ballast 10 operation, i.e. controlling power to a discharge lamp, thereby reducing cost of the microprocessor and communications related components. Also shown in FIG. 3 is "daisy chaining" of serial bus interface 15 allowing many ballasts 10 to be configured (step 119) as a batch process. In other embodiments of the present invention, other wired interfaces 15 may be used including RS-232 or EIA-485, Universal Serial Bus (USB) or Ethernet IEEE 802.3. Alternatively, the connection to the ballast may be achieved with wireless communications, using a wireless RF transceiver attached to the ballast. Examples of wireless communications include Ethernet (IEEE 802.11), GPRS, and Bluetooth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A method for employing an electronic ballast, the method comprising the steps of:

providing a distributor with the electronic ballast, wherein at least one operative parameter of the electronic ballast is configurable to operate at least one of a plurality of gas discharge lamp types;

providing said distributor with a configuration mechanism for configuring said electronic ballast;

subsequent to said providing the distributor with the electronic ballast, attaching the electronic ballast to said configuration mechanism, wherein said configuration mechanism is operatively attached to a client computer and said client computer is operatively attached to a configuration service;

requesting said configuration service to configure said ballast, wherein said requesting is performed by said distributor at said client computer;

configuring said electronic ballast by said configuration mechanism by transmitting instructions from said configuration service to said client computer in response to said requesting, thereby producing a ballast configuration;

updating a data base attached to said configuration service based on said ballast configuration; and detaching said electronic ballast from said configuration mechanism.

2. The method, according to claim 1, wherein said client computer is operatively attached to said configuration service over a wide area network.

3. The method, according to claim 1, wherein said configuration mechanism includes a communications mechanism for communicating between said client computer and said electronic ballast.

4. The method, according to claim 1, wherein said configuring includes storing said at least one operative parameter in memory included in said electronic ballast.

5. An electronic ballast configured according to the method of claim 1.

6. The method according to claim 1, further comprising the step of, prior to said configuring: verifying an identifying parameter of said electronic ballast.

7. The method, according to claim 6, wherein a service policy for said ballast is based on said ballast configuration.

8. A computerized method for remotely configuring an electronic ballast, by a configuration server, wherein a distributor is provided with the electronic ballast and a configuration mechanism for said configuring, the method comprising the steps of:

receiving a request from the distributor to configure said ballast;

said configuring said electronic ballast by transmitting instructions from the configuration server to said configuration mechanism to produce a ballast configuration; and updating a data base attached to the configuration server based on said ballast configuration.

9. The computerized method, according to claim 8, wherein at least one operative parameter of the electronic ballast is configurable to operate at least one type of a plurality of gas discharge lamp types.

10. The computerized method, according to claim 8, wherein the electronic ballast is attached to said configuration mechanism solely during said configuring and subsequent to said configuring, the configuration mechanism is detached from the ballast.

11. The computerized method, according to claim 8, wherein a service policy for said ballast is modified based on said updating.

12. The computerized method, according to claim 8, wherein said configuration mechanism is operatively attached to said configuration server over a network 13. An electronic ballast configured according to the method of claim 8.

14. A program storage device readable by a configuration server, tangibly embodying a program of instructions executable by the configuration server to perform a method for configuring an electronic ballast, wherein a distributor is provided with the electronic ballast and a configuration mechanism for said configuring, the method comprising the steps of claim 8.

15. A method for configuring an electronic ballast, wherein a distributor is provided with the electronic ballast and a client computer, wherein the client computer is operatively attached to a configuration service, the method comprising the steps of:

requesting by the distributor to configure said ballast, thereby transmitting from the client computer a configuration request to said configuration service;

configuring said electronic ballast by receiving instructions from said configuration service; wherein said instructions are in response to said configuration request;

updating a data base attached to said configuration service based on said configuring; and upon completing said configuring, operatively detaching said electronic ballast from the client computer.

16. The computerized method, according to claim 15, further comprising the steps of: tendering payment to said configuration service for said configuring; and printing an invoice for said payment.

17. A program storage device readable by a client computer, tangibly embodying a program of instructions executable by the client computer to perform a method for configuring an electronic ballast, wherein a distributor is provided with the electronic ballast and a client computer for said configuring, wherein the client computer is operatively attached to a configuration service, the method comprising the steps of claim 15.

18. A method for employing an electronic ballast, the method comprising the steps of:

providing a distributor with the electronic ballast, wherein at least one operative parameter of the electronic ballast is configurable to operate at least one of a plurality of gas discharge lamp types;

providing said distributor with a configuration mechanism for configuring said electronic ballast;

attaching the electronic ballast to said configuration mechanism; and subsequent to said providing the distributor with the electronic ballast, configuring said electronic ballast using said configuration mechanism thereby producing a ballast configuration;

updating a data base attached based on said ballast configuration; and detaching said electronic ballast from said configuration mechanism.

19. The method according to claim 18, further comprising the step of, prior to said configuring: verifying an identifying parameter of said electronic ballast.

20. The method, according to claim 18, wherein a service policy for said ballast is based on said ballast configuration.

21. The method, according to claim 18, wherein said at least one operative parameter includes at least two operative parameters selected from the group consisting of:

ignition voltage, ignition duration, ignition frequency, warm-up current, output power, dimming level, automatic dimming control, automatic restart, temperature range, input voltage range, and lifetime.

22. An electronic ballast configured according to the method of claim 18.

23. A program storage device readable by a computer, tangibly embodying a program of instructions executable by the computer to perform a method for configuring an electronic ballast, the method comprising the steps according to the method steps of claim 18.

* * * * *